US010775655B2

(12) United States Patent
Yoo et al.

(10) Patent No.: US 10,775,655 B2
(45) Date of Patent: Sep. 15, 2020

(54) DISPLAY APPARATUS AND BACK LIGHT UNIT INCLUDED THEREIN

(71) Applicant: SAMSUNG ELECTRONICS CO., LTD., Suwon-si, Gyeonggi-do (KR)

(72) Inventors: Jun-Mo Yoo, Yongin-si (KR); Seung Hun Chae, Suwon-si (KR); Han Mi Choi, Anyang-si (KR); Young Chol Lee, Hwaseong-si (KR); Nae-Won Jang, Seongnam-si (KR); Jong Pil Jeon, Suwon-si (KR); Yong Dok Cha, Suwon-si (KR); Jean Hur, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 21 days.

(21) Appl. No.: 15/635,526

(22) Filed: Jun. 28, 2017

(65) Prior Publication Data

US 2018/0004033 A1    Jan. 4, 2018

(30) Foreign Application Priority Data

Jul. 1, 2016    (KR) .......................... 10-2016-0083230

(51) Int. Cl.
*G02F 1/1333* (2006.01)
*G02F 1/1345* (2006.01)
*F21V 8/00* (2006.01)

(52) U.S. Cl.
CPC ..... *G02F 1/133308* (2013.01); *G02B 6/0051* (2013.01); *G02B 6/0088* (2013.01); *G02F 1/13452* (2013.01); *G02B 6/009* (2013.01); *G02F 2001/133314* (2013.01); *G02F 2001/133317* (2013.01); *G02F 2001/133331* (2013.01)

(58) Field of Classification Search
CPC . G02F 1/133308; G02F 6/0051; G02F 6/0088
USPC .......................................................... 362/606
See application file for complete search history.

(56) References Cited

U.S. PATENT DOCUMENTS

| 2003/0169383 | A1* | 9/2003 | Kim ..................... G02B 6/009 349/58 |
| 2004/0150981 | A1* | 8/2004 | Katsuda ............ G02F 1/133615 362/620 |

(Continued)

FOREIGN PATENT DOCUMENTS

| EP | 2 639 632 | 9/2013 |
| EP | 2 957 950 | 12/2015 |

(Continued)

OTHER PUBLICATIONS

International Search Report dated Oct. 18, 2017 in counterpart International Patent Application No. PCT/KR2017/006896.

(Continued)

*Primary Examiner* — Bryon T Gyllstrom
(74) *Attorney, Agent, or Firm* — Nixon & Vanderhye P.C.

(57) ABSTRACT

A display apparatus includes a bottom chassis, a display panel provided in front of the bottom chassis, and a cover film configured to cover the display panel and being fixable to the bottom chassis. With this configuration, a bezel may be minimized (e.g., reduced in size) or eliminated, and the display efficiency may be improved.

16 Claims, 11 Drawing Sheets

(56) References Cited

U.S. PATENT DOCUMENTS

| | | | |
|---|---|---|---|
| 2006/0040520 A1* | 2/2006 | Moh | G02F 1/133308 439/66 |
| 2006/0279216 A1* | 12/2006 | Kim | G02B 6/0085 313/631 |
| 2007/0236910 A1* | 10/2007 | Yun | G02F 1/133308 362/23.18 |
| 2009/0135329 A1* | 5/2009 | Kim | G02F 1/133308 349/58 |
| 2010/0067218 A1* | 3/2010 | Lee | G02F 1/133605 362/97.1 |
| 2010/0302457 A1* | 12/2010 | Yamamoto | G02F 1/133308 348/725 |
| 2012/0050635 A1* | 3/2012 | Yoo | G02F 1/133605 349/58 |
| 2012/0050636 A1* | 3/2012 | Jeong | G02F 1/133308 349/58 |
| 2012/0169963 A1* | 7/2012 | Park | G02F 1/133308 349/62 |
| 2013/0242483 A1* | 9/2013 | Hirasawa | G02F 1/133528 361/679.01 |
| 2015/0009712 A1* | 1/2015 | Hwang | G02B 6/0051 362/611 |
| 2015/0156446 A1* | 6/2015 | Chikazawa | G02B 6/009 348/725 |
| 2015/0378091 A1* | 12/2015 | Uchida | G02B 6/0088 362/611 |

FOREIGN PATENT DOCUMENTS

| | | |
|---|---|---|
| KR | 10-2015-0063835 | 6/2015 |
| WO | 2013/036334 | 3/2013 |

OTHER PUBLICATIONS

Extended EP Search Report dated Feb. 18, 2019 for EP Application No. 17820548.0.

European Office Action dated Sep. 9, 2019 for EP Application No. 17820548.0.

* cited by examiner

DISPLAY APPARATUS AND BACK LIGHT UNIT INCLUDED THEREIN

CROSS-REFERENCE TO RELATED APPLICATION

This application is based on and claims priority under 35 U.S.C. § 119 to Korean Patent Application No. 10-2016-0083230, filed on Jul. 1, 2016 in the Korean Intellectual Property Office, the disclosure of which is incorporated by reference herein in its entirety.

BACKGROUND

1. Field

The present disclosure relates generally to a display apparatus and for example, to a display apparatus having improved display efficiency.

2. Description of Related Art

In general, display apparatuses are apparatuses which display an image on a screen and include monitors or television sets. Self-luminous display panels such as organic light emitting diode (OLED) panels, or light-receiving display panels such as liquid crystal display (LCD) panels are generally used in display apparatuses.

The present disclosure relates to a display module and a display apparatus to which the light-receiving display panel is applied. The display apparatus to which the light-receiving display panel is applied includes a display panel formed with an LCD and in which a screen is displayed, and a backlight unit to supply light to the display panel, and the backlight unit includes a light source, and a plurality of optical sheets to receive the light from the light source and guide the light to the display panel.

The display panel, the backlight unit, and the like are disposed in a space formed between a bottom chassis and a top chassis coupled with the bottom chassis from the front of the bottom chassis. The top chassis fixes the components of the display apparatus and determines a width of a bezel of the display apparatus.

If the bezel is wide, a design of the display apparatus becomes clumsy. Since the bezel determines the extent to which the image is displayed on the display panel, there is a need to reduce the width of the bezel.

SUMMARY

Therefore, it is an example aspect of the present disclosure to provide a display apparatus with improved display efficiency.

It is another example aspect of the present disclosure to provide a display apparatus in which a top chassis may be omitted.

It is another example aspect of the present disclosure to provide a display apparatus capable of maximizing and/or increasing an active area.

It is another example aspect of the present disclosure to provide a display apparatus having a simplified structure.

Additional aspects of the disclosure will be set forth in part in the description which follows and, in part, will be apparent from the description.

In accordance with an example aspect of the present disclosure, a display apparatus includes a bottom chassis and a display panel provided in front of the bottom chassis and a cover film configured to cover the display panel, wherein the cover film is capable of being fixed to the bottom chassis.

The cover film may be integrally formed with the display panel.

The display apparatus may further include an optical module comprising light supplying structures positioned between the bottom chassis and the display panel to supply light to the display panel, and the cover film is provided to be fixable to the bottom chassis to allow the display panel to be in tight contact with the optical module.

The cover film may include a first portion configured to cover a front surface of the display panel and a second portion including a support extending from the first portion and fixed to the bottom chassis.

The second portion may be bendable from the first portion.

The first portion may be provided to cover the entire front surface of the display panel.

The bottom chassis may include a chassis body positioned behind the display panel and a chassis rim formed along the periphery of at least one portion of the chassis body and bent forward from the chassis body, and the support of the second portion is bent from the first portion to face the chassis rim.

The display apparatus may further include a side plate fixed to the support of the second portion, wherein the side plate is engageable with the chassis rim to allow the support of the second portion to be fixed to the chassis rim.

The side plate may include a plate body fixed to the support of the second portion and a plate engaging portion extending from the plate body to be in contact with the chassis rim, and the plate engaging portion may be formed to be convex toward the chassis rim from the plate body to allow the plate body to be spaced apart from the chassis rim by a predetermined distance.

The display apparatus may further include a source printed circuit board configured to control the display panel and a flexible PCB configured to connect the display panel and the source printed circuit board, wherein the side plate forms a space between the chassis rim and the plate body to allow the flexible PCB to pass through the space.

The chassis rim may include a first rim corresponding to one side of the periphery of the display panel to which the flexible PCB is connected and a second rim corresponding to another side of the periphery of the display panel where the flexible PCB is not connected, wherein the second rim may protrude forward from the chassis body in comparison with the first rim.

The cover film may be fixed to the display panel by a lamination process.

The cover film may include a transparent film.

In accordance with an example aspect of the present disclosure, a display apparatus includes a display panel, a backlight unit including a bottom chassis and an optical module comprising light supplying elements positioned between the bottom chassis and the display panel to supply light to the display panel, and a cover film provided to cover a front surface of the display panel and configured to be fixable to the bottom chassis to allow the display panel to be in tight contact with the optical module.

The cover film may include a cover portion and a support portion, the cover portion being configured to cover the front surface of the display panel and integrally formed with the display panel and the support portion comprising a support extending from the cover portion and provided to be fixed to the bottom chassis.

The display apparatus may further include a side plate fixed to the support portion, and the side plate may be engageable with the bottom chassis to allow the support portion to be fixed to the bottom chassis.

In accordance with an example aspect of the present disclosure, a display apparatus includes a bottom chassis and a display panel provided in front of the bottom chassis and a cover film comprising a cover portion and a support portion, the cover portion being configured to cover the entire front surface of the display panel, and a support portion comprising a support extending from the cover portion and a side plate provided on the support portion and detachably mounted on the bottom chassis, wherein the cover film is integrally formed with the display panel and the side plate.

The side plate may include a plate body integrally formed with the support portion and a plate engaging portion extending from the plate body to be in contact with the bottom chassis, and the plate engaging portion may be formed to be convex toward the bottom chassis from the plate body to allow the plate body to be spaced apart from the bottom chassis.

The display apparatus may further include a source printed circuit board configured to control the display panel and a flexible PCB configured to connect the display panel and the source printed circuit board, wherein the side plate forms a space between the bottom chassis and the plate body to allow the flexible PCB to pass through the space.

The bottom chassis may include a chassis body and a chassis rim formed along the periphery of at least a part of the chassis body, and the chassis rim may include a first rim corresponding to one side of the periphery of the display panel to which the flexible PCB is connected and a second rim corresponding to another side of the periphery of the display panel where the flexible PCB is not connected, the second rim protruding forward from the chassis body in comparison with the first rim.

BRIEF DESCRIPTION OF THE DRAWINGS

These and/or other aspects, features and attendant advantages of the disclosure will become apparent and more readily appreciated from the following detailed description, taken in conjunction with the accompanying drawings, in which like reference numerals refer to like elements, and wherein.

DETAILED DESCRIPTION

The various example embodiments described herein and the configurations illustrated in the drawings are only example embodiments of the present disclosure, and various modifications may be made without departing from the scope of the present disclosure.

In addition, the like reference numerals or symbols shown in the drawings of the present disclosure indicate components or components that perform substantially the same function.

Throughout the disclosure, the terms used are merely used to describe particular example embodiments, and are not intended to limit the present disclosure.

As used herein, the singular forms "a", "an" and "the" are intended to include the plural forms as well, unless the context clearly indicates otherwise.

Also, it is to be understood that the terms such as "include", "have", or the like, are intended to indicate the existence of the features, numbers, operations, components, parts, or combinations thereof disclosed in the disclosure, and are not intended to preclude the possibility that one or more other features, numbers, operations, components, parts, or combinations thereof may exist or may be added.

It is also to be understood that terms including ordinals such as "first", "second" and the like used herein may be used to describe various elements, but the elements are not limited to the terms, and it is used only for the purpose of distinguishing one component from another. For example, the first component may be referred to as a second component, and similarly, the second component may also be referred to as a first component.

The term "and/or" includes any combination of a plurality of related listed items or any of the plurality of related listed items.

Hereinafter, various example embodiments of the present disclosure will be described in greater detail with reference to the accompanying drawings.

Figure 1:
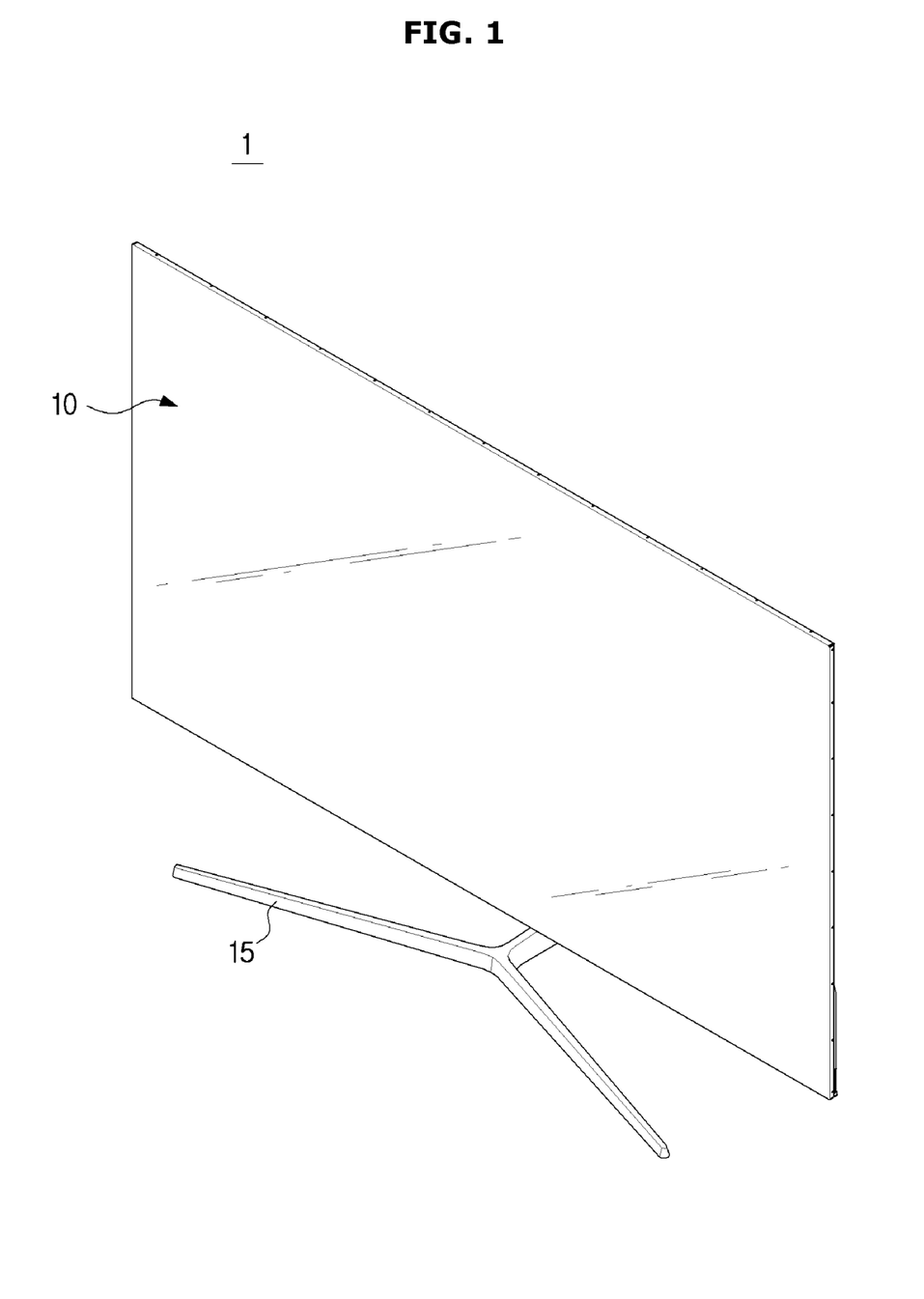
FIG. 1 is diagram illustrating a perspective view of an example display apparatus according to an example embodiment of the present disclosure.
Figure 2:
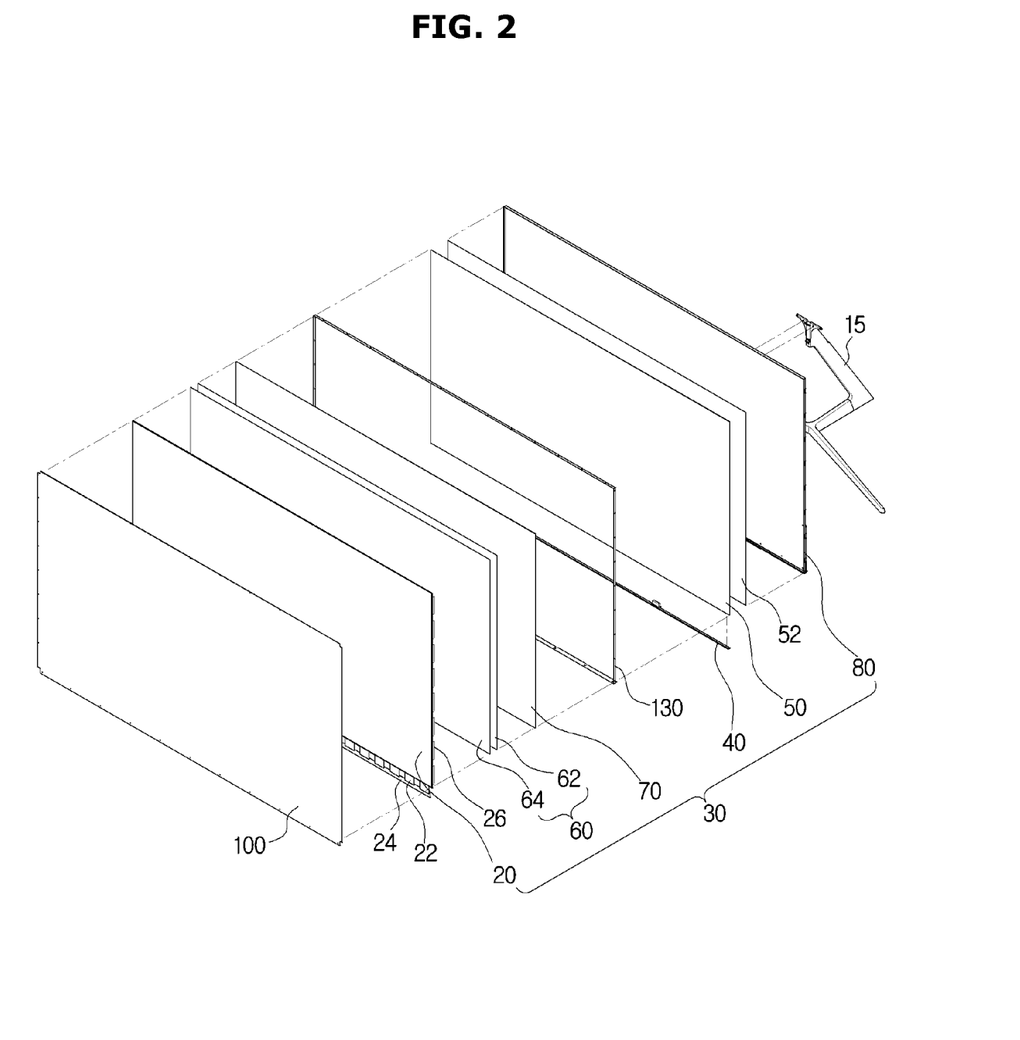
FIG. 2 is an exploded perspective view of an example display apparatus according to an example embodiment of the present disclosure.

FIG. 1 is a diagram illustrating a perspective view of an example display apparatus according to an example embodiment of the present disclosure and FIG. 2 is an exploded perspective view of an example display apparatus according to an example embodiment of the present disclosure.

For convenience of explanation, a flat display apparatus is shown as an example of the display apparatus 1, but the display apparatus 1 is not limited thereto. The display apparatus 1 may be a curved display apparatus having a curved shape and having opposite sides protruding forward from the center, and a flexible (bendable) display apparatus that is convertible between a curved surface state and a planar surface state.

In addition, example embodiments of the present disclosure may be applied to the display apparatus 1 regardless of the screen size. For example, the display apparatus 1 may be applied to portable TV products such as smart TVs and monitors, which may be installed on tables, walls and ceilings, and portable products such as tablets, notebooks, smart phones, and e-books, or the like, but are not limited thereto.

The display apparatus 1 includes a display module 10 for displaying an image.

The display module 10 includes a display panel 20 on which an image is displayed and a backlight unit 30 that supplies light to the display panel 20. The backlight unit 30 may include an optical module and a display chassis. The optical module may include a light source 40, an optical sheet 60, and a light guide plate 50. For example, the optical module includes a light source 40 for generating light and a light guide plate 50 for diffusing the light from the light source 40 and transmitting the light to the display panel 20 located in front thereof and an optical sheet 60 disposed between the light guide plate 50 and the display panel 20 to change optical properties. The optical module may include a diffusion plate 70 disposed between the light guide plate 50 and the display panel 20 to diffuse the light received from the light guide plate 50. The display chassis may include a bottom chassis 80.

Although a flat display apparatus is described as the display apparatus 1 in the present embodiment, the display apparatus 1 may also be applied to a curved display apparatus or a bendable or flexible display apparatus that is convertible between the curved surface state and the planar surface state as described above.

When the display apparatus 1 is formed as a curved surface, the display module 10 of the display apparatus 1 is also formed to have a curvature in the left-right direction. Accordingly, the display panel 20 and the backlight unit 30 forming the display module 10 are respectively formed to have a curvature in the left-right direction, so that the opposite ends of the display panel 20 and the backlight unit 30 protrude forward from the center, respectively. The curvatures of the display panel 20 and the backlight unit 30 may be the same, but they may be designed differently depending on the design.

The light source 40 is disposed inside the bottom chassis 80 and may emit light toward the inner center of the bottom chassis 80. In an example embodiment of the present disclosure, the light source 40 is provided at a lower part of the display module 10 and is arranged to irradiate the upper part. However, the present disclosure is not limited thereto, and the light source 40 may be provided along at least one side of the periphery of the display module 10. For example, a pair of light sources may be provided on both sides of the bottom chassis 80 to emit light toward the inner central side of the bottom chassis 80. In addition to this edge type display, a light source 40 may be applied to a direct type display.

Figure 7:
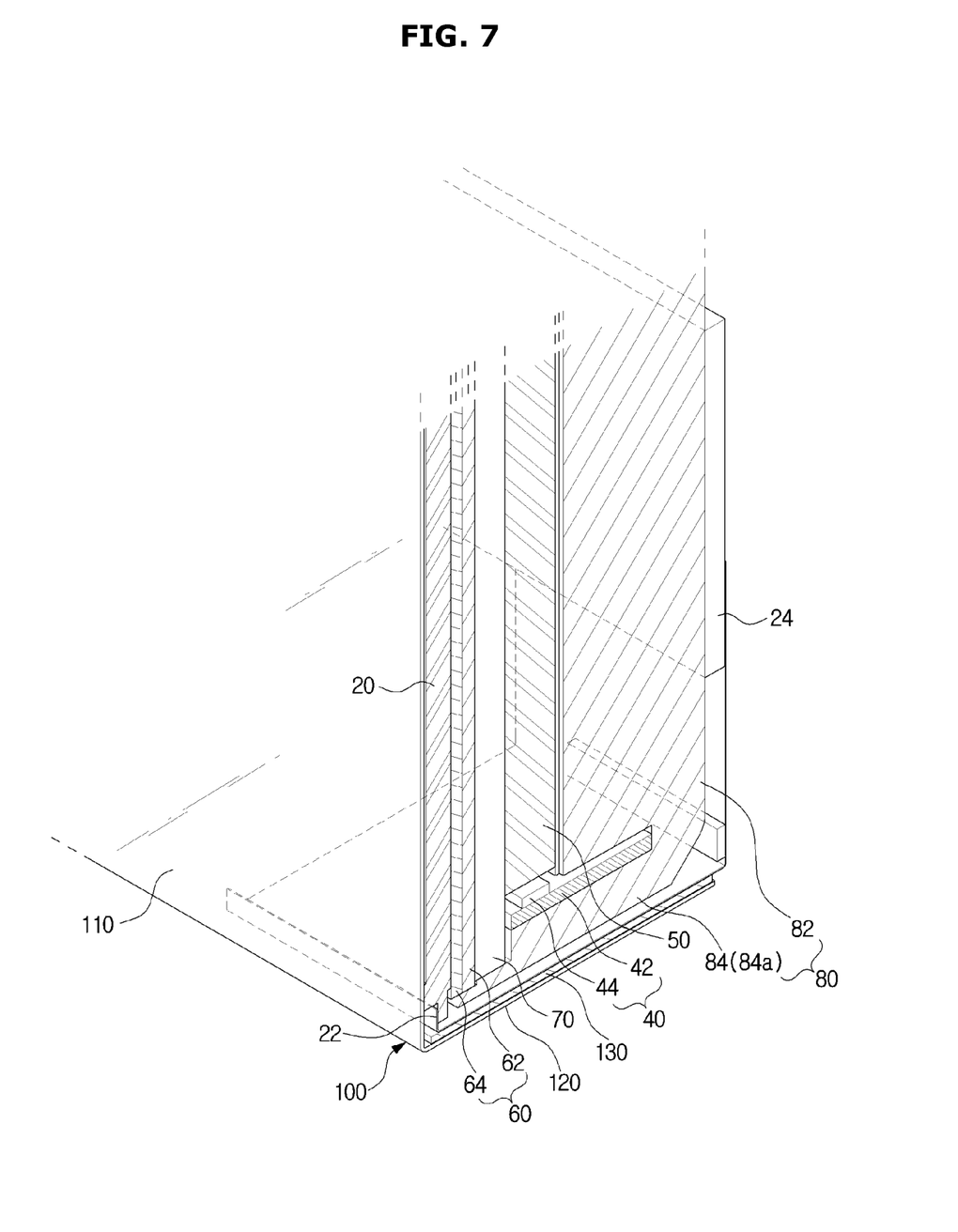
FIG. 7 is a partial cross-sectional view of an example display apparatus according to an example embodiment of the present disclosure.

The light source 40 includes a light emitting diode (LED) 44 (see FIG. 7). A plurality of light emitting diodes 44 may be arranged at predetermined intervals to form one module. Each of the modules may be disposed at an edge portion of the light guide plate 50.

The display apparatus 1 may include a support 15. The support 15 is provided to stand the display module 10.

Figure 3:
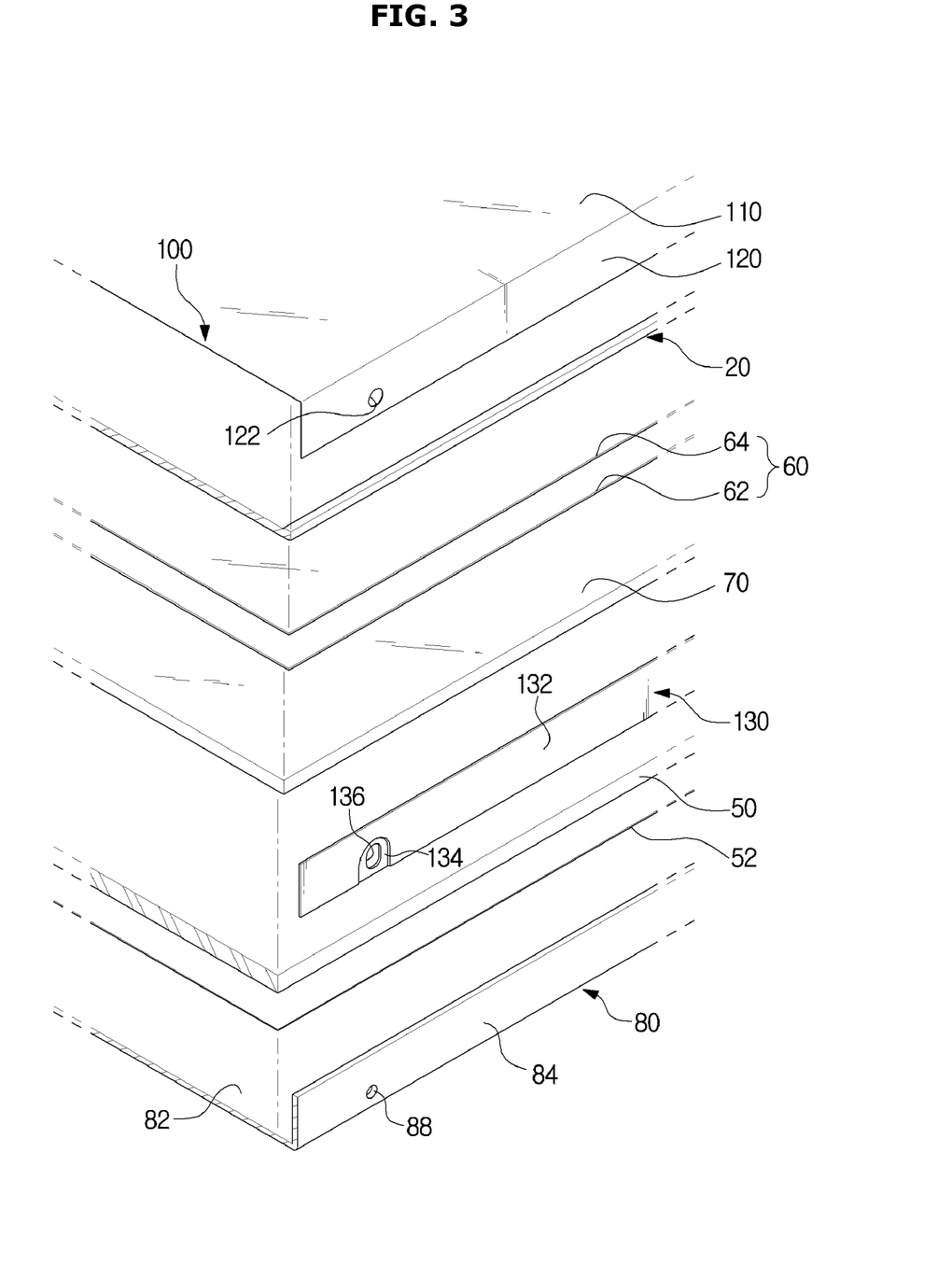
FIG. 3 is an enlarged view of an exploded perspective view of an example display apparatus according to an example embodiment of the present disclosure.
Figure 4:
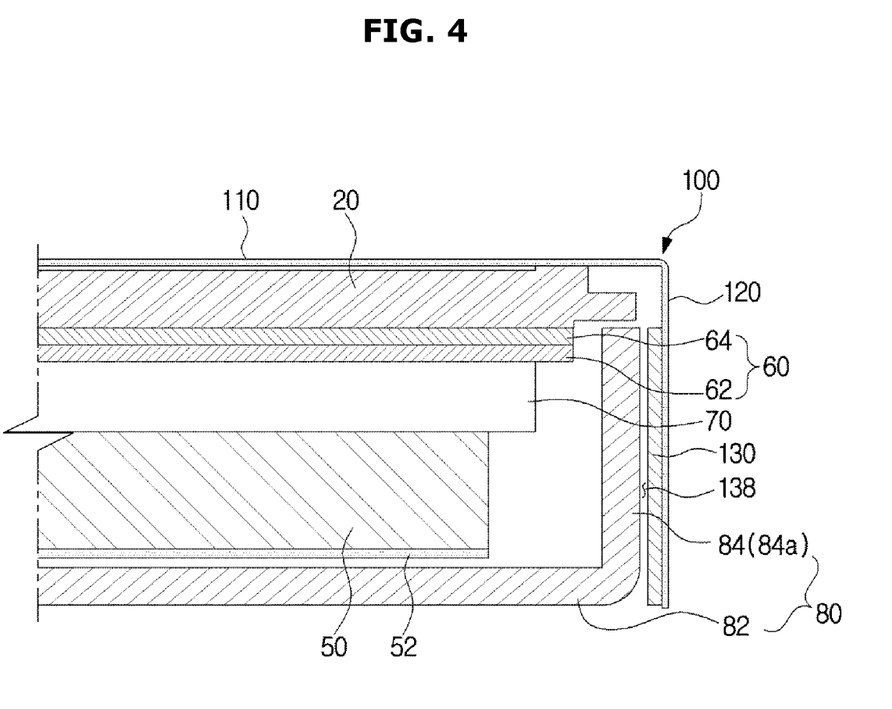
FIGS. 4 and 5 are partial cross-sectional views of an example display apparatus according to an example embodiment of the present disclosure.
Figure 5:
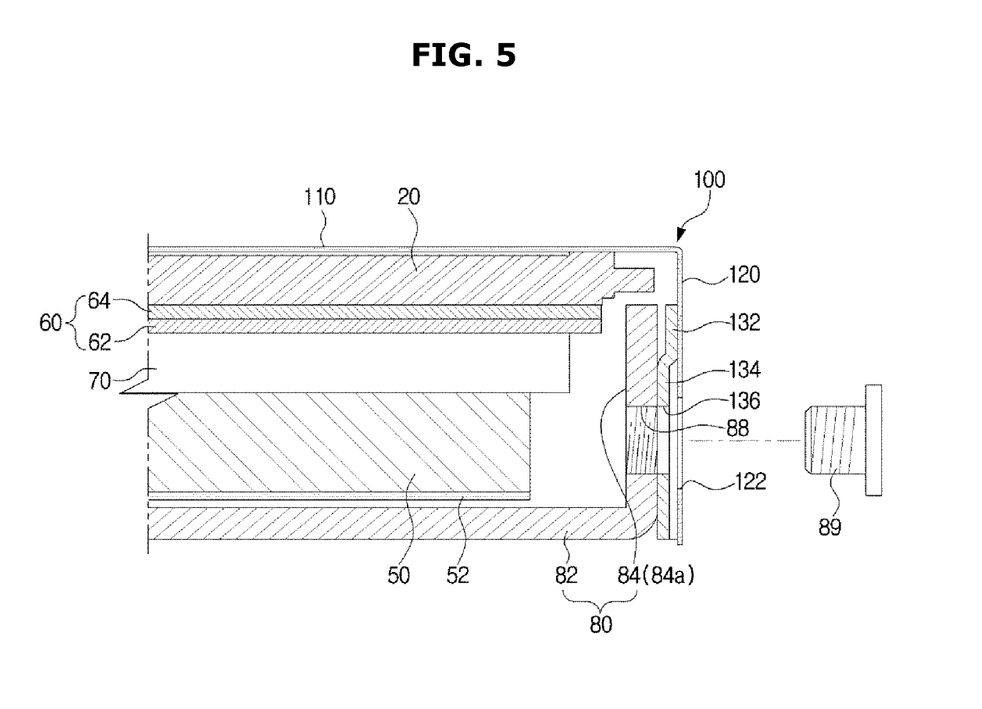

FIG. 3 is an enlarged view of an exploded perspective view of an example display apparatus according to an example embodiment of the present disclosure, FIGS. 4 and 5 are partial cross-sectional views of an example display apparatus according to an example embodiment of the present disclosure.

The light guide plate 50 may be disposed in front of the bottom chassis 80. For example, the light guide plate 50 may be positioned on the front surface of a chassis body 82 of the bottom chassis 80 such that the light source 40 is positioned between a chassis rim 84 and the light guide plate 50. That is, the light source 40 may be disposed on at least one side of the periphery of the light guide plate 50.

The light guide plate 50 may include a reflective member 52 on the back surface thereof. The reflective member 52 may be provided on the back surface of the light guide plate 50 such that substantially all light emitted from the light source 40 is directed toward the front surface of the light guide plate 50. The reflecting member 52 may be formed as a reflecting plate separately from the light guide plate 50 and disposed on the back surface of the light guide plate 50 or may be integrally formed with the light guide plate 50. Further, by reflectively coating the back surface of the light guide plate 50, the same effect as the above effect may be obtained.

The light guide plate 50 is provided so as to transmit light generated from the light source 40.

For this, the light guide plate 50 may be formed of a transparent resin material. The light guide plate 50 may be spaced apart from the light source 40 by a predetermined distance so as to reduce deformation due to heat generated in the light source 40.

The display apparatus 1 may include an optical sheet 60 having optical properties.

The optical sheet 60 may include a diffuser sheet 62 for diffusing incident light and a double bright enhancement film (DBEF) sheet 64 as, for example, a high-brightness prism sheet. The optical sheet 60 is disposed between the light guide plate 50 and the display panel 20 to change the optical properties of the light emitted from the light guide plate 50.

The display apparatus 1 may include a cover film 100.

The cover film 100 is provided to cover the display panel 20. The cover film 100 may be fixed to the bottom chassis 80. The cover film 100 may be fixed to the bottom chassis 80 while covering the display panel 20 so that the internal components of the display apparatus 1 are not separated from the bottom chassis 80. That is, the cover film 100 is fixed to the bottom chassis 80 so that the display panel 20 is in tight contact with the optical module. With such a configuration, the display panel 20 and the backlight unit 30 are in tight contact with each other, and it is not necessary to configure the top chassis separately.

The cover film 100 may include a transparent material. The cover film 100 may be formed of a material for improving the image quality displayed on the display panel 20. In addition, the cover film 100 may include a material having durability and/or heat resistance so as to protect the display panel 20.

The cover film 100 may be integrally formed with the display panel 20. The cover film 100 may be formed integrally with the display panel 20 through a process. For example, the cover film 100 may be integrally formed on the display panel 20 by a lamination process. However, the method of fixing the cover film 100 to the display panel 20 is not limited thereto, and any other manufacturing methods may also be used as long as the cover film 100 is configured to be fixed to the display panel 20.

The cover film 100 may be provided to cover the front surface of the display panel 20. For example, the cover film 100 may be provided to cover the entire front surface of the display panel 20.

The cover film 100 may include a cover portion 110 and a support portion 120.

The cover portion 110 covers the front surface of the display panel 20. In detail, the cover 110 may cover the entire front surface of the display panel 20. To this end, the cover 110 may be formed to be equal to or larger than the area of the front surface of the display panel 20.

The support portion 120 may extend from the cover portion 110 such that the cover film 100 is fixed to the bottom chassis 80. In this example embodiment, the support portion 120 is formed to extend along at least one portion of the periphery of the cover portion 110. However, the present disclosure is not limited thereto. For example, the supporting portion 120 may be formed along the entire edge of the cover portion 110.

The support portion 120 is provided to be bent from the cover portion 110. The cover film 100 may be made of a thin material to be easily bent. The support portion 120 may be bent from the cover 110 to be positioned on the side of the display apparatus 1.

The bottom chassis 80 forms a rear surface of the display module 10 and includes a chassis body 82 disposed behind the display panel 20 and a chassis rim 84 bent from the chassis body 82 and extending forward. The support portion 120 may be configured to be bent from the cover portion 110 and face the chassis rim 84.

The display apparatus may include a side plate 130.

The side plate 130 is configured to be fixed to the cover film 100 and coupled to the bottom chassis 80 such that the cover film 100 is fixed to the bottom chassis 80. The material of the side plate 130 may include metal or plastic, without being limited thereto. The shape of the side plate 130 is generally flat. However, at least one portion of the side plate 130 may have a curvature depending on the shape of the display apparatus.

The side plate 130 may be positioned on the support portion 120 of the cover film 100. The side plate 130 is coupled to the chassis rim 84 while being fixed to the supporting portion 120 so that the supporting portion 120 is fixed to the bottom chassis 80. In this example embodiment, the side plate 130 is disposed on the inner surface of the support 120. However, the position of the side plate 130 is not limited thereto and the side plate 130 may be located on the outer surface of the support 120.

The side plate 130 may include a plate body 132 and a plate coupling portion 134. FIG. 4 is a cross-sectional view showing a portion passing through the plate body 132 in the display apparatus 1, and FIG. 5 is a cross-sectional view showing a portion passing through the plate coupling portion 134.

The plate body 132 forms the body of the side plate 130. Further, the plate body 132 may be integrally fixed to the support 120. As described above, the cover film 100 may be integrally formed with the display panel 20 and further be integrally formed with the side plate 130. As an example, the cover film 100 may be integrally formed on the display panel 20 and the side plate 130 by a lamination process.

The plate coupling portion 134 is provided such that the side plate 130 may be fixed to the bottom chassis 80. The plate coupling portion 134 may have a plate coupling hole 136. The plate coupling hole 136 may be provided so as to coincide with a support hole 122 formed in the support portion 120 and a chassis hole 88 formed in the bottom chassis 80. The side plate 130, the bottom chassis 80, and the support portion 120 may be coupled by screwing through the plate coupling hole 136, the support hole 122, and the chassis hole 88.

The plate coupling portion 134 may be formed so as to be convex from the plate body 132 toward the chassis rim 84.

In detail, the outer surface of the plate coupling portion 134 may be formed to be more concave than the outer surface of the plate body 132. In addition, the inner surface of the plate coupling portion 134 may be formed more convex than the inner surface of the plate body 132. With this configuration, when the side plate 130 is coupled with the bottom chassis 80, the plate coupling portion 134 may contact the chassis rim 84 of the bottom chassis 80 and the plate body 132 may be spaced apart from the chassis rim 84. Also, the outer surface of the plate coupling portion 134 more concave than the plate body 132 may allow a head portion of a screw 89 to be mounted thereon.

Figure 6:
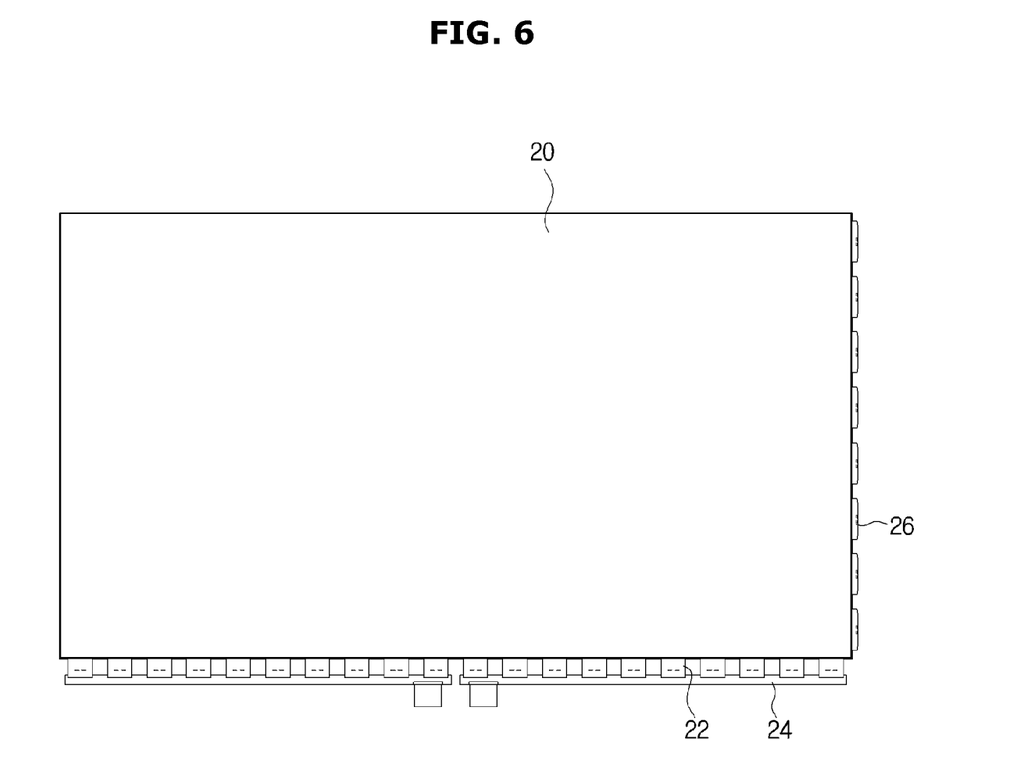
FIG. 6 is a diagram illustrating an example display panel of a display apparatus according to an example embodiment of the present disclosure.

FIG. 6 is a diagram illustrating an example display panel of a display apparatus according to an example embodiment of the present disclosure. FIG. 7 is a partial cross-sectional view of a display apparatus according to an example embodiment of the present disclosure.

The display panel 20 may, for example, and without limitation, be a liquid crystal display panel. The display panel 20 includes a thin film transistor substrate on which a thin film transistor is formed, a color filter substrate facing the thin film transistor substrate, and a liquid crystal layer provided between the thin film transistor substrate and the color filter substrate.

The display panel 20 includes a flexible printed circuit board (PCB) 22 provided on one side of the thin film transistor substrate, a driving chip mounted on the flexible PCB 22, and a source PCB 24 connected to the other side of the flexible PCB 22. A gate driver 26 to drive gate lines of the display panel 20 may be further provided on a side surface of the display panel 20.

The source printed circuit board 24 to control the display panel 20 may be provided behind the display panel 20. The display panel 20 and the source printed circuit board 24 are connected via a plurality of flexible PCBs 22. One side of the flexible PCB 22 may be bonded to the display panel 20 and the other side may be bonded to the source printed circuit board 24.

The flexible PCB 22 extends from the lower end of the display panel 20 toward the source printed circuit board 24 which is spaced apart from the lower rear side of the display panel 20 to connect the display panel 20 and the source printed circuit board 24. The flexible PCB 22 may include a circuit for power supply and signal transmission.

The flexible PCB 22 may be bent to connect the display panel 20 and the source printed circuit board 24 which are spaced apart in the front-rear direction. The flexible PCB 22 may be bent in a U-shape to connect the display panel 20 and the source printed circuit board 24.

For example, the flexible PCB 22 may extend out of the bottom chassis 80 and be bent to enclose one end of the bottom chassis 80. When the flexible PCB 22 is bent, the source printed circuit board 24 connected to the other side of the flexible PCB 22 may be positioned behind the bottom chassis 80.

The side plate 130 may form a space 138 (see FIG. 4) between the chassis rim 84 and the plate body 132 to allow the flexible PCB 22 to pass therethrough.

The space 138 is provided to allow the flexible PCB 22 to be bent such that the flexible PCB 22 may connect the display panel 20 positioned in front of the bottom chassis 80 and the source printed circuit board 24 positioned behind the bottom chassis 80 without wasting any additional space.

Figure 8:
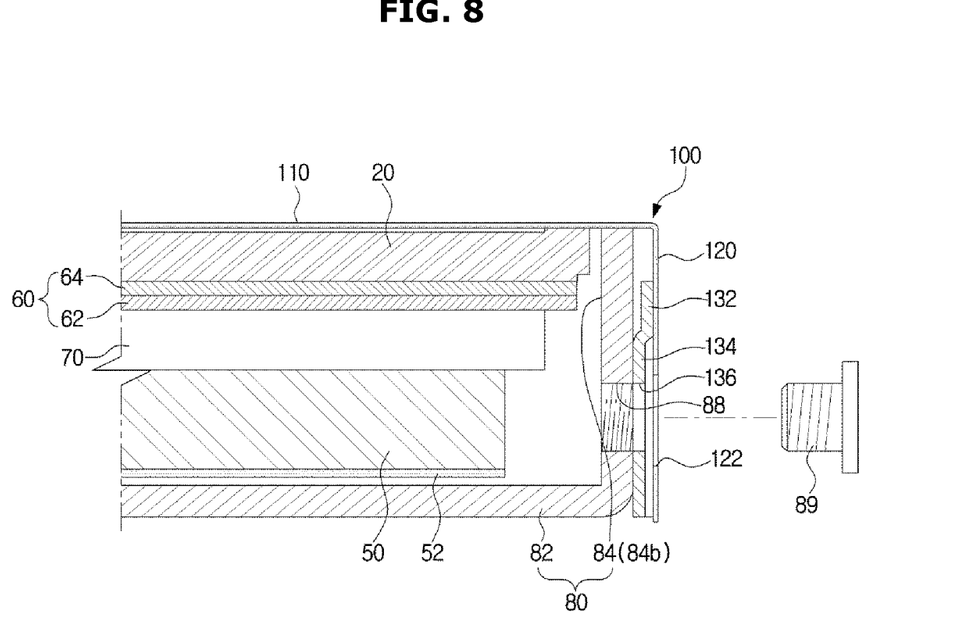
FIG. 8 is a partial cross-sectional view of an example display apparatus according to an example embodiment of the present disclosure.

FIG. 8 is a partial cross-sectional view of an example display apparatus according to an example embodiment of the present disclosure. The description will be made with reference to the sectional views shown above.

The bottom chassis 80 may include a first rim 84a and a second rim 84b.

The display panel 20 may be connected to the source printed circuit board 24 by the flexible PCB 22 as described above. The flexible PCB 22 is connected to at least one side of the display panel 20.

The first rim 84a is formed to correspond to one side of the periphery of the display panel 20 to which the flexible PCB 22 is connected. One end of the first rim 84a may be configured not to interfere with the flexible PCB 22 connected to the display panel 20 in a planar direction thereof. That is, the end of the first rim 84a may be positioned behind the display panel 20. Also, the first rim 84a may be provided at a portion where the gate driver 26 of the display panel 20 is located.

The second rim 84b is formed to correspond to the other side of the display panel 20 where the flexible PCB 22 is not connected. The second rim 84b may be formed to protrude forward from the body of the bottom chassis 80 in comparison with the first rim 84a. Since the second rim 84b does not interfere with the flexible PCB 22, the second rim 84b may protrude more than the first rim 84a to guide the periphery of the display panel 20.

The first and second rims 84a and 84b are formed in the display panel 20 so as to divide a portion where the flexible PCB 22 is connected and the other portion where the flexible PCB 22 is not connected, the black matrix (BM) formed along the periphery of the display panel 20 may have the same width.

Hereinafter, a display apparatus according to another example embodiment of the present disclosure will be described. The description of the configuration that is the same as the above-described embodiment will be omitted.

Figure 9:
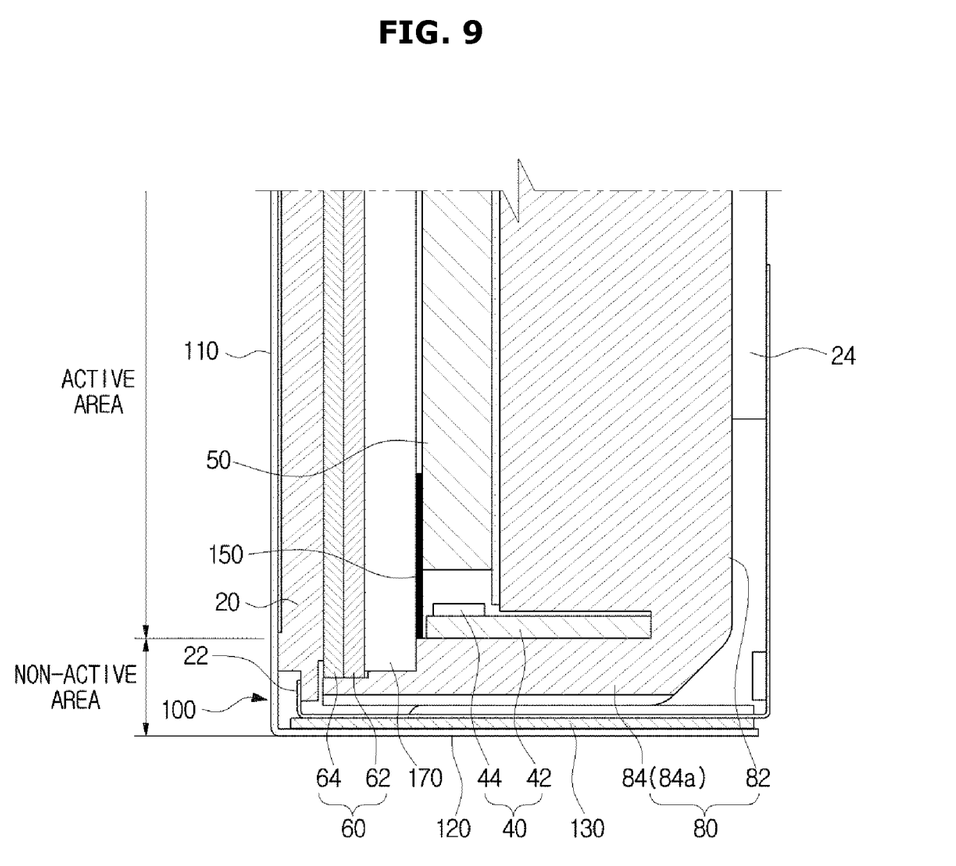
FIG. 9 is a partial cross-sectional view of an example display apparatus according to another example embodiment of the present disclosure.
Figure 10:
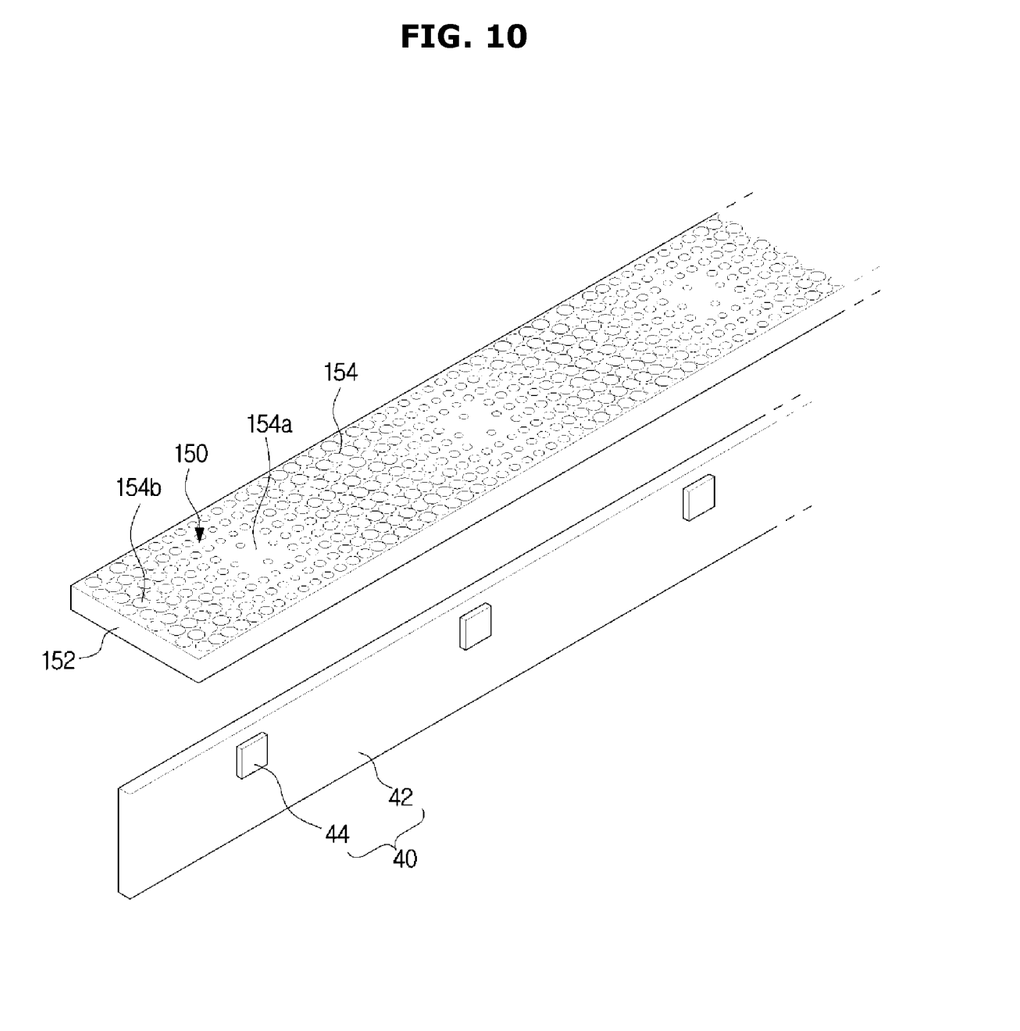
FIG. 10 is a diagram illustrating a relationship between a light regulating member and a light source in a display apparatus according to another example embodiment of the present disclosure.

FIG. 9 is a partial cross-sectional view of an example display apparatus according to another example embodiment of the present disclosure. FIG. 10 is a view showing a relationship between a light regulating member and a light source in a display apparatus according to another example embodiment of the present disclosure.

The light source 40 may be provided such that a plurality of light emitting diodes 44 are arranged at predetermined intervals to form one module. The plurality of light emitting diodes 44 may be disposed on the light source support 42 so as to be spaced apart from each other. The light source 40 may be disposed on at least one side of the periphery of the light guide plate 50.

The display panel 20 may have an active area AA for displaying an image and a non-active area NAA formed outside the active area AA. The light source 40 is positioned behind the display panel 20, more specifically, behind the active area AA. Since the light source 40 is not positioned behind the periphery of the display panel 20 or the non-active area NAA of the display panel 20 but behind the active area AA of the display panel 20, the bezel of the display apparatus 1 may be minimized and/or reduced and the active area AA may be maximized and/or increased relative to the overall width of the display apparatus.

The display apparatus 1 may include a light regulating member 150.

The light regulating member 150 may be positioned in front of the light source 40 located behind the active area AA. That is, the light control member 150 may be positioned between the light source 40 and the active area AA of the display panel 20.

The light regulating member 150 is positioned in front of the light source 40 so that light emitted from the light source 40, passing through the light regulating member 150, and illuminating the display panel 20 is configured to be the same as or similar to light emitted from the light source 40, passing through the light guide plate 50, and illuminating the display panel 20.

When light, which does not pass through the light guide plate 50 or is reflected by a predetermined angle or more, is displayed on the display panel 20, the light cannot be spread uniformly on the display panel 20 but is concentrated on a specific area of the display panel 20. This phenomenon may be referred to as a light smudge. In order to prevent such a phenomenon, the light regulating member 150 may be disposed above the light source 40 to supply the display panel 20 with uniform illumination.

The light regulating member 150 may be disposed in front of the light source 40 and positioned between the light guide plate 50 and the optical sheet 60 or between the light guide plate 50 and the diffusion plate 70. Although the light regulating member 150 is illustrated as being positioned between the light guide plate 50 and the diffusion plate 70, the present disclosure is not limited thereto. The light regulating member 150 may be printed on the back surface of the optical sheet 60 or the diffusion plate 70 positioned in front of the light source 40, or may be attached in the form of a film.

The light regulating member 150 may include a member body 152 that forms the body of the light regulating member 150 and a regulating pattern 154.

The member body 152 may be formed in a film shape. However, the shape of the member body 152 is not limited thereto. For example, as described above, the member body 152 may be printed on the optical sheet 60 or the diffusion plate 70, and may be provided with different curvatures in the width direction.

The member body 152 may be made of an opaque material that does not allow light to pass therethrough, or may be configured to allow light to pass therethrough and diffuse.

The regulating pattern 154 is formed on the member body 152 and may be formed of a plurality of light transmitting portions. The light transmitting portion may be formed in the shape of a fine hole. However, the shape of the light transmitting portion is not limited thereto, and may also be formed in a transparent shape such that light may pass therethrough.

The regulating pattern 154 has a first pattern portion 154a formed in front of the light emitting diode 44 of the light source 40 and a second pattern portion 154b spaced apart from the first pattern portion 154a. That is, the second pattern portion 154b may be located farther away from the light source 40 than the first pattern portion 154a.

Since the first pattern portion 154a is located in front of the light emitting diode 44, the number of the light transmitting portions may be relatively smaller than that of the second pattern portion 154b for light regulation. The second pattern portion 154b may have more light transmitting portions than the first pattern portion 154a so as to be denser than the first pattern portion 154a. That is, as the distance from the light emitting diode 44 increases, a plurality of fine holes on the member body 152 may be arranged densely. That is, the first pattern portion 154a may be configured such that the density of the light transmitting portion is smaller than that of the second pattern portion 154b. With this configuration, it is possible to prevent the light smudge which may be formed in front of the light source 40.

In the above description, the member body 152 may be formed of a material that is opaque or light diffusive, and the light transmitting portion of the regulating pattern 154 may be formed of a transparent material or formed as a hole. On the contrary, the member body 152 may also be formed of a transparent material, and the regulating pattern 154 may also be formed of an opaque or light diffusive material. In this case, the first pattern portion 154a may be formed to be denser than the second pattern portion 154b.

Hereinafter, a display apparatus according to still another example embodiment of the present disclosure will be described. The description of the configuration that is the same as or similar to the above-described embodiment may be omitted.

Figure 11:
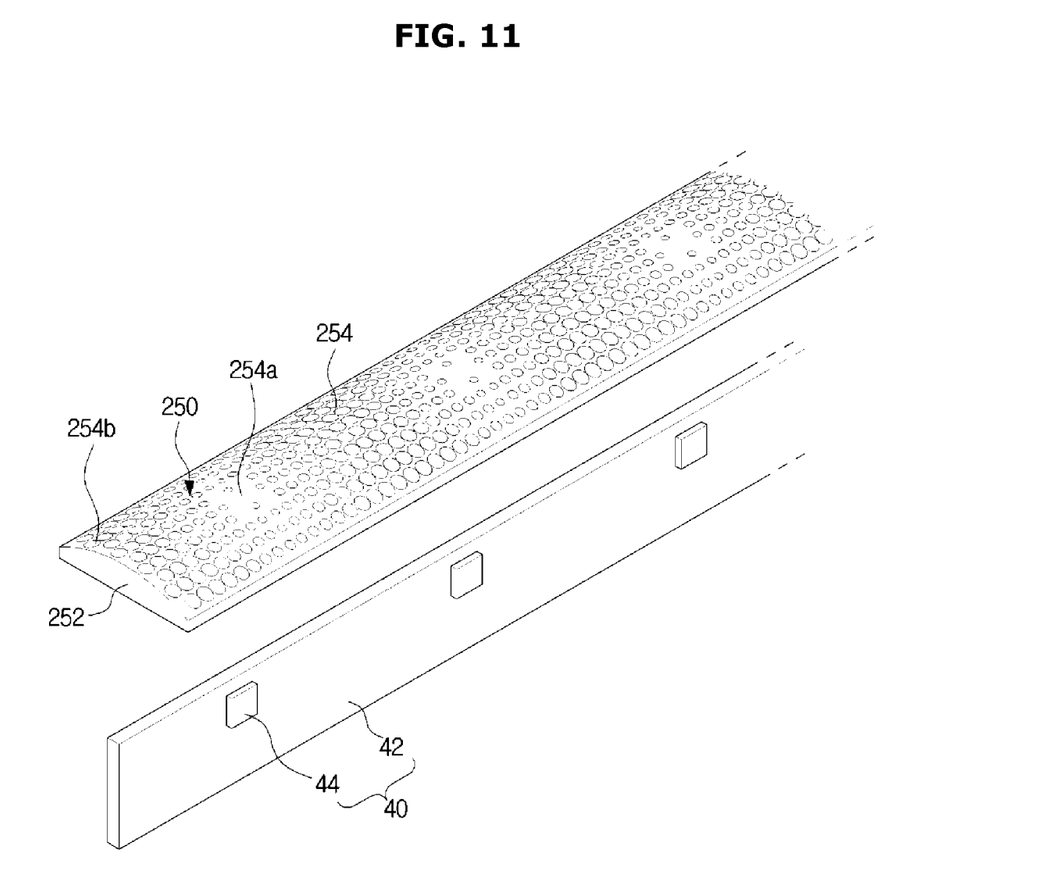
FIG. 11 is a diagram illustrating a relationship between a light regulating member and a light source in a display apparatus according to still another example embodiment of the present disclosure.

FIG. 11 is a view showing a relationship between a light regulating member and a light source in a display apparatus according to still another example embodiment of the present disclosure.

The display apparatus 1 may include a light regulating member 250.

The light regulating member 250 may be positioned in front of the light source 40 located behind the active area AA. That is, the light control member 250 may be positioned between the light source 40 and the active area AA of the display panel 20.

Since the light regulating member 250 is positioned in front of the light source 40, light emitted from the light source 40 and passing through the light regulating member 250, illuminating the display panel 20 is configured to be the same as or similar to light emitted from the light source 40, passing through the light guide plate 50, and illuminating the display panel 20.

The light regulating member 250 may include a member body 252 that forms the body of the light regulating member 250 and a regulating pattern 254.

The member body 252 may be provided to have a plate shape having a curvature in a width direction. That is, the member body 252 may be configured such that a portion closer to the light source 40 is thicker than another portion farther from the light source 40.

The member body 252 may be made of an opaque material that does not allow light to pass therethrough, or may be configured to allow light to pass therethrough and diffuse.

The regulating pattern 254 is formed on the member body 252 and may be formed of a plurality of light transmitting portions. The light transmitting portion may be formed in the shape of a fine hole. However, the shape of the light transmitting portion is not limited thereto, and may also be formed in a transparent shape such that light may pass therethrough.

The regulating pattern 254 has a first pattern portion 254a formed in front of the light emitting diode 44 of the light source 40 and a second pattern portion 154b spaced apart from the first pattern portion 254a. That is, the second pattern portion 154b may be located farther away from the light source 40 than the first pattern portion 254a.

Since the first pattern portion 254a is located in front of the light emitting diode 44, the number of the light transmitting portions may be relatively smaller than that of the second pattern portion 254b for light control. The second pattern portion 254b may have more light transmitting portions than the first pattern portion 254a so as to be denser than the first pattern portion 254a. That is, as the distance from the light emitting diode 44 increases, a plurality of fine holes on the member body 252 may be arranged densely. That is, the first pattern portion 154a may be configured such that the density of the light transmitting portion is smaller than that of the second pattern portion 254b. With this configuration, it is possible to prevent the light smudge which may be formed in front of the light source 40.

In the above description, the member body 252 may be formed of a material that is opaque or light diffusive, and the light transmitting portion of the regulating pattern 254 may be formed of a transparent material or formed as a hole. On the contrary, the member body 252 may also be formed of a transparent material, and the regulating pattern 254 may be also formed of an opaque or light diffusive material. In this case, the first pattern portion 254a may be formed to be denser than the second pattern portion 254b.

As is apparent from the above description, according to an example embodiment of the present disclosure, by minimizing and/or reducing the bezel or constructing a structure without a bezel, the display efficiency may be improved and the active area may be increased.

Further, the display panel may be efficiently fixed to the display chassis, and the display panel may be easily come into tight contact with the backlight units.

In addition, since the structure covering the display panel may be omitted, the structure of the display apparatus may be simplified, and aesthetic effect may be obtained.

In addition, it is possible to increase the active area of the display apparatus, thereby enhancing immersive feelings of the user.

Although various example embodiments of the present disclosure have been illustrated and described above, the disclosure is not limited to the aforementioned specific example embodiments. Those skilled in the art may variously modify the disclosure without departing from the scope of the disclosure claimed by the appended claims.

What is claimed is:

1. A display apparatus comprising:
   a display panel;
   a bottom chassis provided behind the display panel; and
   a single transparent cover film configured to entirely cover a front surface of the display panel, the single transparent cover film configured to be fixable to the bottom chassis via a screw which extends through a hole in the bottom chassis,
   wherein the bottom chassis comprises a chassis body positioned behind the display panel, and a chassis rim formed along a periphery of at least one portion of the chassis body and bent forward from the chassis body,
   wherein the single transparent cover film comprises a cover portion configured to entirely cover a front surface of the display panel, and a support portion integrally extending from the cover portion and bent backward from the cover portion to face the chassis rim.

2. The display apparatus according to claim 1, wherein the single transparent cover film is integrally formed with the display panel.

3. The display apparatus according to claim 1, further comprising an optical module comprising a light source positioned between the bottom chassis and the display panel and configured to supply light to the display panel,
   wherein the single transparent cover film is configured to be fixable to the bottom chassis to allow the display panel to be in tight contact with the optical module.

4. The display apparatus according to claim 1, wherein the support portion is configured to be bendable from the cover portion of the single transparent cover film.

5. The display apparatus according to claim 1, wherein the cover portion of the single transparent cover film is configured to cover the entire front surface of the display panel.

6. The display apparatus according to claim 1, further comprising a side plate fixed to the support portion of the single transparent cover film, the side plate configured to be engaged with the chassis rim to allow the support portion to be fixed to the chassis rim.

7. The display apparatus according to claim 6, wherein the side plate comprises: a plate body fixed to the support portion of the single transparent cover film; and a plate engaging portion extending from the plate body and configured to be in contact with the chassis rim, the plate engaging portion being convex toward the chassis rim from the plate body to allow the plate body to be spaced apart from the chassis rim by a predetermined distance.

8. The display apparatus according to claim 7, further comprising: a source printed circuit board (PCB) configured to control the display panel; and a flexible PCB connecting the display panel and the source printed circuit board, wherein the side plate forms a space between the chassis rim and the plate body when engaged with the chassis rim to allow the flexible PCB to pass through the space.

9. The display apparatus according to claim 7, wherein the chassis rim comprises:

a first rim corresponding to one side of a periphery of the display panel to which a flexible PCB is connected; and a second rim corresponding to the other side of the periphery of the display panel where the flexible PCB is not connected, the second rim protruding forward from the chassis body.

10. The display apparatus according to claim 1, wherein the single transparent cover film is fixed to the display panel by a lamination process.

11. A display apparatus comprising:

a display panel;

a backlight unit comprising a bottom chassis and an optical module comprising a light source positioned between the bottom chassis and the display panel and configured to supply light to the display panel, the bottom chassis at least partially defining a rear surface of the display apparatus, the rear surface positioned to face away from a viewer of the display apparatus; and a single transparent cover film comprising a cover portion configured to entirely cover a front surface of the display panel and a support portion integrally extending from the cover portion and configured to be fixable to the bottom chassis via a screw which extends through a hole in the bottom chassis to allow the display panel to be in tight contact with the optical module wherein the bottom chassis comprises a chassis body positioned behind the display panel, and a chassis rim formed along a periphery of at least one portion of the chassis body and bent forward from the chassis body, wherein the support portion is bent backward from the cover portion to face the bottom chassis rim.

12. The display apparatus according to claim 11, further comprising a side plate fixed to the support portion of the single transparent cover film, the side plate configured to be engageable with the bottom chassis to allow the support portion to be fixed to the bottom chassis.

13. A display apparatus comprising:

a bottom chassis at least partially defining a rear surface of the display apparatus, the rear surface positioned to face away from a viewer of the display apparatus;

a display panel provided in front of the bottom chassis;

a single transparent cover film comprising a cover portion configured to cover the entire front surface of the display panel, and a support portion integrally extending from the cover portion, the support portion of the single transparent cover film configured to be fixable to the bottom chassis via a screw which extends through a hole in the bottom chassis; and a side plate provided on the support portion and detachably mounted on the bottom chassis, wherein the bottom chassis comprises a chassis body and a chassis rim formed along a periphery of at least a part of the chassis body, wherein the cover portion is integrally formed with the display panel, and wherein the support portion is bent backward from the cover portion to face the bottom chassis rim and integrally formed with the side plate.

14. The display apparatus according to claim 13, wherein the side plate comprises a plate body integrally formed with the support portion; and a plate engaging portion extending from the plate body to be in contact with the bottom chassis, the plate engaging portion being convex toward the bottom chassis from the plate body to allow the plate body to be spaced apart from the bottom chassis.

15. The display apparatus according to claim 14, further comprising: a source printed circuit board (PCB) configured to control the display panel; and a flexible PCB configured to connect the display panel and the source printed circuit board, wherein the side plate forms a space between the bottom chassis and the plate body to allow the flexible PCB to passes through the space.

16. The display apparatus according to claim 15, the chassis rim comprises a first rim corresponding to one side of the periphery of the display panel to which the flexible PCB is connected and a second rim corresponding to the other side of the periphery of the display panel where the flexible PCB is not connected, the second rim protruding forward from the chassis body.

* * * * *